United States Patent
Byeon et al.

(10) Patent No.: US 12,190,075 B2
(45) Date of Patent: Jan. 7, 2025

(54) APPARATUS AND METHOD FOR PROCESSING VOICE COMMANDS

(71) Applicant: Samsung Electronics Co., Ltd., Suwon-si (KR)

(72) Inventors: Jooyong Byeon, Suwon-si (KR); Seolhee Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 17/664,834

(22) Filed: May 24, 2022

(65) Prior Publication Data

US 2022/0284197 A1 Sep. 8, 2022

Related U.S. Application Data

(63) Continuation of application No. PCT/KR2022/002142, filed on Feb. 14, 2022.

(30) Foreign Application Priority Data

Feb. 24, 2021 (KR) .......................... 10-2021-0024733

(51) Int. Cl.
*G10L 15/00* (2013.01)
*G06F 40/58* (2020.01)
*G10L 15/22* (2006.01)

(52) U.S. Cl.
CPC ............ *G06F 40/58* (2020.01); *G10L 15/005* (2013.01); *G10L 15/22* (2013.01); *G10L 2015/223* (2013.01)

(58) Field of Classification Search
CPC .................................. G10L 15/22; G06F 40/56
See application file for complete search history.

(56) References Cited

U.S. PATENT DOCUMENTS

| 6,111,937 A | 8/2000 | Kuroiwa et al. |
| 10,891,958 B2 * | 1/2021 | Gao ........................ G10L 15/22 |

(Continued)

FOREIGN PATENT DOCUMENTS

| JP | 2019-200239 A | 11/2019 |
| JP | 2020-181044 A | 11/2020 |

(Continued)

OTHER PUBLICATIONS

International Search Report of the International Searching Authority dated May 23, 2022, in connection with International Application No. PCT/KR2022/002142, 3 pages.

*Primary Examiner* — Daniel Abebe

(57) ABSTRACT

An apparatus for processing voice commands includes: a memory configured to store computer-executable instructions, and a processor configured to execute the computer-executable instructions. When executed, the instructions cause the processor to perform: receiving an utterance of a user in an input language set by the user, determining an utterance intent of the utterance by analyzing the utterance with the input language, determining a standard utterance in the input language corresponding to the utterance of the user based on the determined utterance intent, determining whether the input language and an output language are different languages, extracting a standard utterance in the output language corresponding to the determined standard utterance in the input language when the input language and the output language are different, generating an output response in the output language based on the extracted standard utterance in the output language, and outputting the output response.

16 Claims, 11 Drawing Sheets

(56) References Cited

U.S. PATENT DOCUMENTS

| | | | |
|---|---|---|---|
| 2010/0017193 A1* | 1/2010 | Runge | G10L 15/22 |
| | | | 704/8 |
| 2014/0272821 A1 | 9/2014 | Pitschel et al. | |
| 2018/0268816 A1* | 9/2018 | Sano | G10L 15/02 |
| 2020/0117502 A1 | 4/2020 | Ni et al. | |
| 2020/0160837 A1 | 5/2020 | Jeong | |
| 2020/0320984 A1* | 10/2020 | Kuczmarski | G06N 20/00 |
| 2021/0210076 A1* | 7/2021 | Kuczmarski | G06F 16/3329 |

FOREIGN PATENT DOCUMENTS

| | | |
|---|---|---|
| KR | 10-2008-0084803 A | 9/2008 |
| KR | 10-2015-0136583 A | 12/2015 |
| KR | 10-2018-0045633 A | 5/2018 |
| KR | 10-2018-0096183 A | 8/2018 |
| KR | 10-2105876 B1 | 4/2020 |
| KR | 10-2020-0140171 A | 12/2020 |
| WO | 2010086928 A1 | 8/2010 |

\* cited by examiner

APPARATUS AND METHOD FOR PROCESSING VOICE COMMANDS

CROSS-REFERENCE TO RELATED APPLICATIONS

This application is a bypass continuation of International Application No. PCT/KR2022/002142, filed Feb. 14, 2022, which claims priority to Korean Patent Application No. 10-2021-0024733, filed Feb. 24, 2021, the disclosures of which are incorporated by reference herein in their entireties.

BACKGROUND

1. Field

The following disclosure relates to voice command processing technology.

2. Description of Related Art

A voice command processing apparatus such as voice assistant may perform a task or service for a user based on an instruction or a question. To enable the voice command processing apparatus to understand a command of a user and provide an appropriate response, a developer tool (e.g., integrated development environment (IDE) is used to define a domain and define a goal and a slot (or parameter) according to a function supportable for each domain in advance. Preparing templates of responses for goals may allow the voice command processing device to output an appropriate response to a command of a user.

SUMMARY

A user may want to use a voice command processing service in a language other than his/her native language. However, when the user utters a voice command, which is executed smoothly with the native language, in another language, the voice command may not be executed smoothly, or a desired action may not be executed after trials and errors since each language requires different utterance expressions supported to process voice commands. This indicates that it is not easy to use a domain that supports a multilingual service unless a user is multilingual.

A voice command processing apparatus according to certain embodiments may efficiently parallelize corresponding utterances in multiple languages and provide responses in languages different from the language used for a voice command based on the parallelized utterances.

According to certain embodiments, an apparatus for processing voice commands includes: a memory configured to store computer-executable instructions, and a processor configured to execute the computer-executable instructions, wherein the instructions may include: receiving an utterance of a user in an input language set by the user, determining an utterance intent of the utterance by analyzing the utterance with the input language, determining a standard utterance in the input language corresponding to the utterance of the user based on the determined utterance intent, determining whether the input language and an output language are different languages, extracting a standard utterance in the output language corresponding to the determined standard utterance in the input language when the input language and the output language are different, generating an output response in the output language based on the extracted standard utterance in the output language, and outputting the output response.

A voice command processing apparatus according to certain embodiments may generate a multilingual parallel corpus by parallelizing corresponding utterances for respective languages when a domain of the voice command processing apparatus is being developed.

The voice command processing apparatus according to certain embodiments may output a response to a voice command in a language different from the language used for the voice command using the generated multilingual parallel corpus.

The voice command processing apparatus according to certain embodiments may output a standard utterance in an output language supported by the voice command processing apparatus, as an utterance corresponding to the utterance of the voice command along with the response to the voice command. A user may check the standard utterance in the output language and thereby accurately input a voice command in a language other than his/her native language.

The voice command processing apparatus according to certain embodiments may output responses to a voice command in a plurality of output languages.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
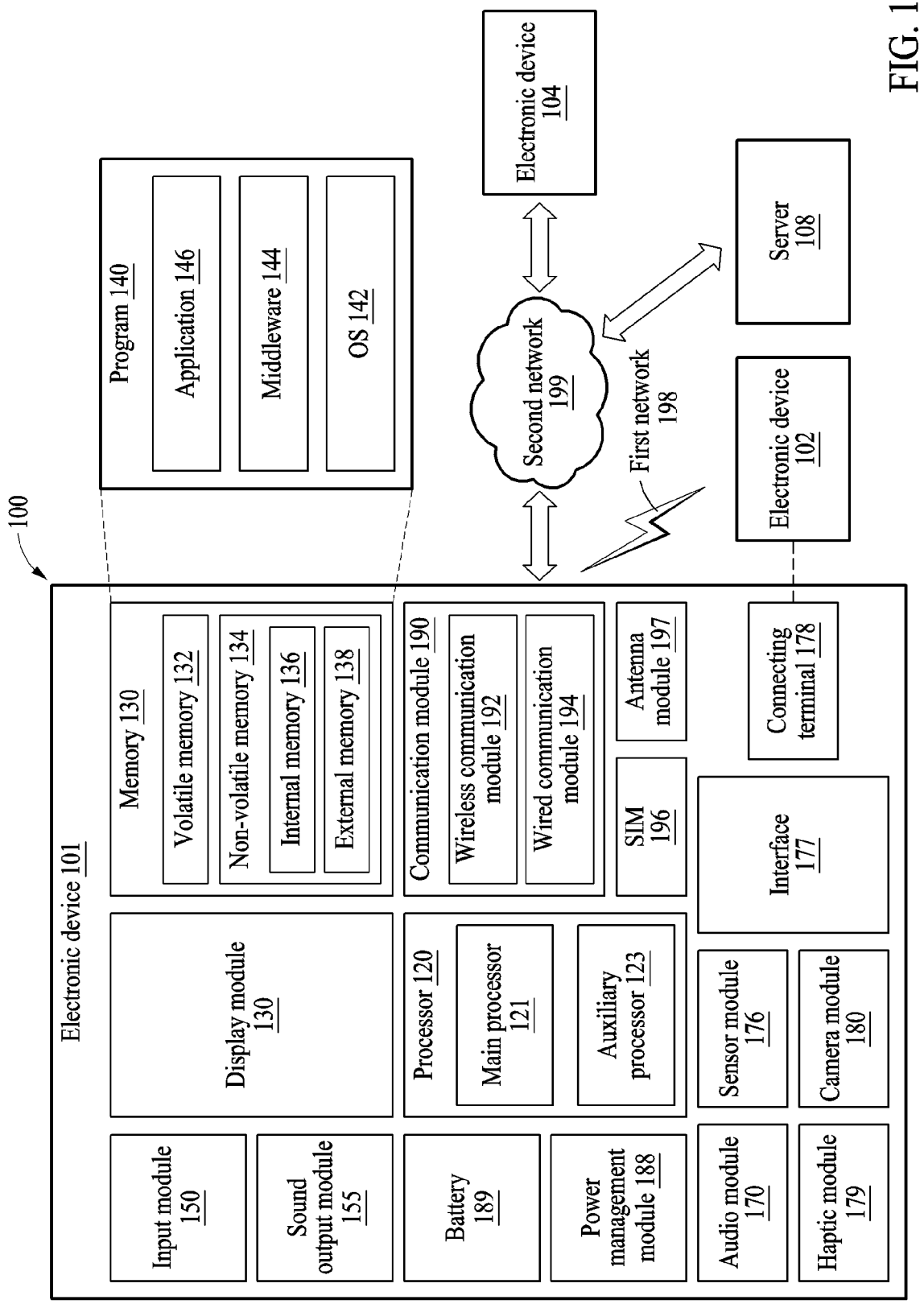
FIG. 1 illustrates a block diagram to describe a configuration of a user terminal according to various embodiments of this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to various embodiments of this disclosure. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to certain embodiments, the electronic device 101 may communicate with the electronic device 104 via the server 108. According to certain embodiments, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to certain embodiments, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to certain embodiments, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to certain embodiments, the auxiliary processor 123 (e.g., an ISP or a CP) may be implemented as a portion of another component (e.g., the camera module 180 or the communication module 190) that is functionally related to the auxiliary processor 123. According to certain embodiments, the auxiliary processor 123 (e.g., an NPU) may include a hardware structure specified for artificial intelligence (AI) model processing. An AI model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to certain embodiments, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to certain embodiments, the display device 160 may include a touch sensor adapted to sense a touch, or a pressure sensor adapted to measure an intensity of a force incurred by the touch.

The audio module 170 may convert a sound into an electric signal or vice versa. According to certain embodiments, the audio module 170 may obtain the sound via the input device 150 or output the sound via the sound output device 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to certain embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to certain embodiments, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to certain embodiments, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to certain embodiments, the haptic module 179 may include, for example, a motor, a piezoelectric element, or an electric stimulator.

The camera module 180 may capture a still image and moving images. According to certain embodiments, the camera module 180 may include one or more lenses, image sensors, ISPs, or flashes.

The power management module 188 may manage power supplied to the electronic device 101. According to certain embodiments, the power management module 188 may be implemented as, for example, at least a part of a power management integrated circuit (PMIC).

The battery 189 may supply power to at least one component of the electronic device 101. According to certain embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to certain embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to certain embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to certain embodiments, the antenna module 197 may include an antenna including a radiating element including a conductive material or a conductive pattern formed in or on a substrate (e.g., a printed circuit board (PCB)). According to certain embodiments, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to certain embodiments, another component (e.g., a radio frequency integrated circuit (RFIC)) other than the radiating element may be additionally formed as a part of the antenna module 197.

According to various example embodiments, the antenna module 197 may form a mmWave antenna module. According to certain embodiments, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to certain embodiments, commands or data may be transmitted or received between the electronic device 101 and the external electronic device 104 via the server 108 coupled with the second network 199. Each of the external electronic devices 102 or 104 may be a device of the same type as or a different type from the electronic device 101. According to certain embodiments, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to certain embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
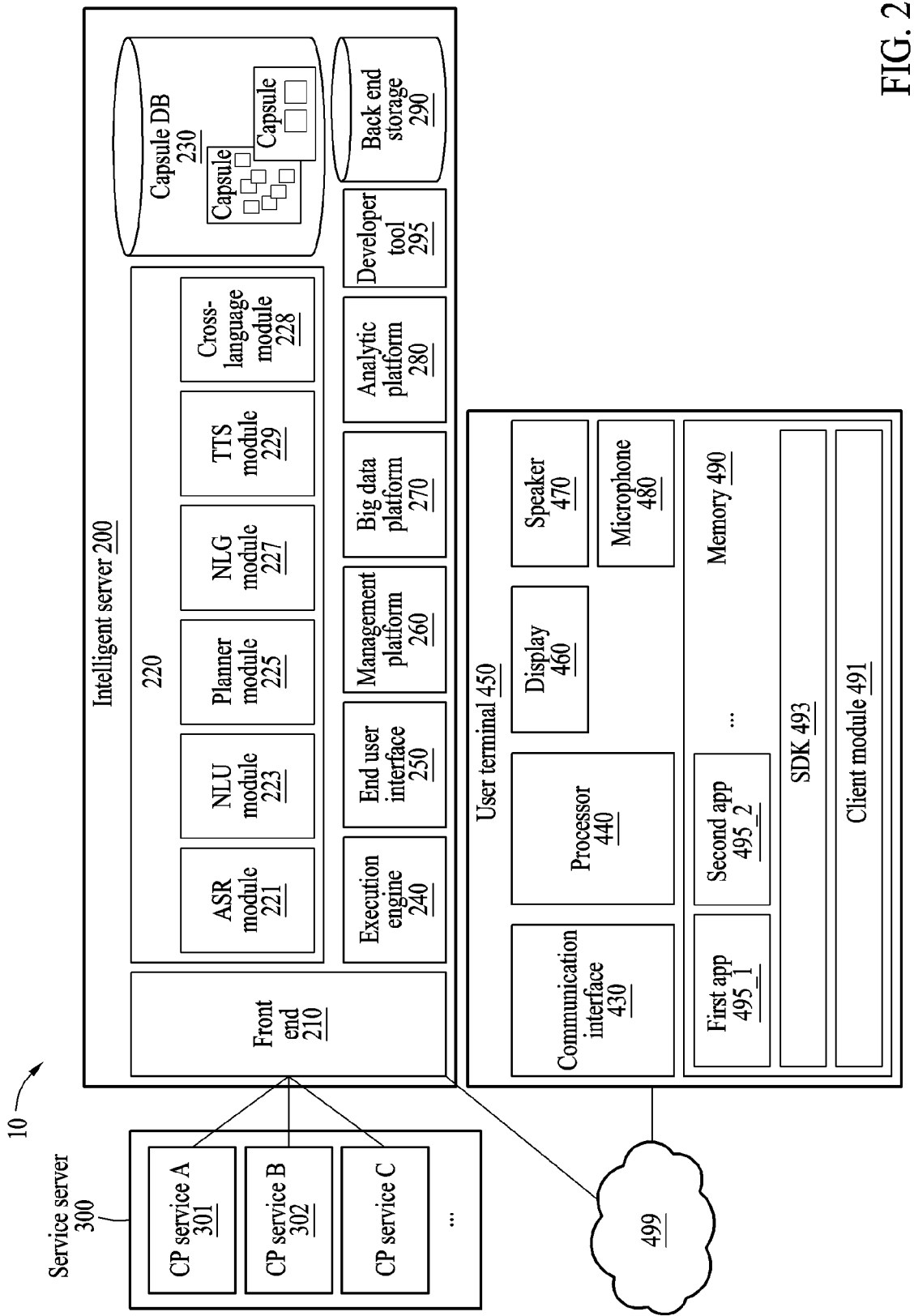
FIG. 2 illustrates an integrated intelligence system according to embodiments of this disclosure.

FIG. 2 is a block diagram illustrating an integrated intelligence system according to embodiments of this disclosure.

Referring to FIG. 2, an integrated intelligence system 10 may include a user terminal 450, an intelligent server 200, and a service server 300. The user terminal 450 and the intelligent server 200 may be implemented as a single device.

The user terminal 450 may be a terminal device (or an electronic device (e.g., the electronic device 101 of FIG. 1)) connectable to the Internet, and may be, for example, a mobile phone, a smartphone, a personal digital assistant (PDA), a notebook computer, a TV, a white home appliance, a wearable device, a head-mounted display (HMD), or a smart speaker.

According to the shown example embodiment, the user terminal 450 may include a communication interface 430 (e.g., the communication module 190 of FIG. 1), a microphone 480 (e.g., the input module 150 of FIG. 1), a speaker 470 (e.g., the sound output module 155 of FIG. 1), a display 460 (e.g., the display module 160 of FIG. 1), a memory 490 (e.g., the memory 130 of FIG. 1), or a processor 440 (e.g., the processor 120 of FIG. 1). The components listed above may be operationally or electrically connected to each other.

The communication interface 430 may be connected to an external device and configured to transmit and receive data to and from the external device, such as via a network 499 (e.g., the second network 199 of FIG. 1). The microphone 480 may receive a sound (e.g., a user utterance) and convert the sound into an electrical signal. The speaker 470 may output the electrical signal as a sound (e.g., a speech). The display 460 may be configured to display an image or video. The display 460 may also display a graphical user interface (GUI) of an app (or an application program) being executed.

The memory 490 may store a client module 491, a software development kit (SDK) 493, and a plurality of apps 495. The client module 491 and the SDK 493 may configure a framework (or a solution program) for performing general-purpose functions. In addition, the client module 491 or the SDK 493 may configure a framework for processing a voice input.

The plurality of apps 495 may be programs for performing designated functions. The plurality of apps 495 may include a first app 495_1, a second app 495_2, and the like. Each of the plurality of apps 495 may include a plurality of actions for performing a designated function. For example, the apps may include an alarm app, a messaging app, and/or a scheduling app. The plurality of apps 495 may be executed by the processor 440 to sequentially execute at least a portion of the plurality of actions.

The processor 440 may control the overall operation of the user terminal 450. For example, the processor 440 may be electrically connected to the communication interface 430, the microphone 480, the speaker 470, and the display 460 to perform a designated operation.

The processor 440 may also perform the designated function by executing the program stored in the memory 490. For example, the processor 440 may execute at least one of the client module 491 or the SDK 493 to perform the following operation for processing a voice input. The processor 440 may control the operation of the plurality of apps 495 through, for example, the SDK 493. The following operation which is the operation of the client module 491 or the SDK 493 may be performed by the processor 440.

The client module 491 may receive a voice input. For example, the client module 491 may receive a voice signal corresponding to a user utterance sensed through the microphone 480. The client module 491 may transmit the received voice input to the intelligent server 200. The client module 491 may transmit state information of the user terminal 450 together with the received voice input to the intelligent server 200. The state information may be, for example, execution state information of an app.

The client module 491 may receive a result corresponding to the received voice input. For example, when the intelligent server 200 is capable of calculating a result corresponding to the received voice input, the client module 491 may receive the result corresponding to the received voice input. The client module 491 may display the received result on the display 460.

The client module 491 may receive a plan corresponding to the received voice input. The client module 491 may display results of executing a plurality of actions of an app according to the plan on the display 460. The client module 491 may, for example, sequentially display the results of executing the plurality of actions on the display. As another example, the user terminal 450 may display only a partial result of executing the plurality of actions (e.g., a result of the last action) on the display.

According to certain embodiments, the client module 491 may receive a request for obtaining information necessary for calculating a result corresponding to the voice input from the intelligent server 200. According to certain embodiments, the client module 491 may transmit the necessary information to the intelligent server 200 in response to the request.

The client module 491 may transmit information on the results of executing the plurality of actions according to the plan to the intelligent server 200. The intelligent server 200 may confirm that the received voice input has been correctly processed using the information on the results.

The client module 491 may include a speech recognition module. According to certain embodiments, the client module 491 may recognize a voice input for performing a limited function through the speech recognition module. For example, the client module 491 may execute an intelligent app for processing a voice input to perform an organic operation through a designated input (e.g., Wake up!).

The intelligent server 200 may receive information related to a user voice input from the user terminal 450 through a communication network. According to certain embodiments, the intelligent server 200 may change data related to the received voice input into text data. According to certain embodiments, the intelligent server 200 may generate a plan for performing a task corresponding to the user voice input based on the text data.

According to certain embodiments, the plan may be generated by an artificial intelligence (AI) system. The artificial intelligence system may be a rule-based system or a neural network-based system (e.g., a feedforward neural network (FNN) or a recurrent neural network (RNN)). Alternatively, the artificial intelligence system may be a combination thereof or other artificial intelligence systems. According to certain embodiments, the plan may be selected from a set of predefined plans or may be generated in real time in response to a user request. For example, the artificial intelligence system may select at least one plan from among the predefined plans.

The intelligent server 200 may transmit a result according to the generated plan to the user terminal 450 or transmit the generated plan to the user terminal 450. According to certain embodiments, the user terminal 450 may display the result according to the plan on the display. According to certain embodiments, the user terminal 450 may display a result of executing an action according to the plan on the display.

The intelligent server 200 may include a front end 210, a natural language platform 220, a capsule database (DB) 230, an execution engine 240, an end user interface 250, a management platform 260, a big data platform 270, an analytic platform 280, a back end storage 290, or a developer tool 295.

The front end 210 may receive the received voice input from the user terminal 450. The front end 210 may transmit a response corresponding to the voice input.

According to certain embodiments, the natural language platform 220 may include an automatic speech recognition (ASR) module 221, a natural language understanding (NLU) module 223, a planner module 225, a natural language generator (NLG) module 227, a cross-language module 228, or a text-to-speech (TTS) module 229.

The ASR module 221 may convert the voice input received from the user terminal 450 into text data. The NLU module 223 may discern an intent of a user using the text data of the voice input. For example, the NLU module 223 may discern the intent of the user by performing syntactic analysis or semantic analysis. The NLU module 223 may discern the meaning of a word extracted from the voice input using a linguistic feature (e.g., a grammatical element) of a morpheme or phrase, and determine the intent of the user by matching the discerned meaning of the word to an intent.

The planner module 225 may generate a plan using a parameter and the intent determined by the NLU module 223. According to certain embodiments, the planner module 225 may determine a plurality of domains required to perform a task based on the determined intent. The planner module 225 may determine a plurality of actions included in each of the plurality of domains determined based on the intent. According to certain embodiments, the planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user. The planner module 225 may determine a relationship between the plurality of actions and the plurality of concepts stepwise (or hierarchically). For example, the planner module 225 may determine an execution order of the plurality of actions determined based on the intent of the user, based on the plurality of concepts. In other words, the planner module 225 may determine the execution order of the plurality of actions based on the parameter required for the execution of the plurality of actions and results output by the execution of the plurality of actions. Accordingly, the planner module 225 may generate a plan including connection information (e.g., ontology) between the plurality of actions and the plurality of concepts. The planner module 225 may generate the plan using information stored in the capsule DB 230 that stores a set of relationships between concepts and actions.

The NLG module 227 may change designated information into a text form. The information changed to the text form may be in the form of a natural language utterance. The cross-language module 228 may request and receive response information for the voice input in a language different from the language of the voice input received from the user terminal 450. The TTS module 229 may change information in a text form into information in a speech form.

According to certain embodiments, some or all of the functions of the natural language platform 220 may be implemented in the user terminal 450 as well.

The capsule DB 230 may store information on the relationship between the plurality of concepts and actions corresponding to the plurality of domains. A capsule according to certain embodiments may include a plurality of action objects (or action information) and concept objects (or concept information) included in the plan. According to certain embodiments, the capsule DB 230 may store a plurality of capsules in the form of a concept action network (CAN). According to certain embodiments, the plurality of capsules may be stored in a function registry included in the capsule DB 230.

The capsule DB 230 may include a strategy registry that stores strategy information necessary for determining a plan corresponding to a voice input. The strategy information may include reference information for determining one plan when there are a plurality of plans corresponding to the voice input. According to certain embodiments, the capsule DB 230 may include a follow-up registry that stores information on follow-up actions for suggesting a follow-up action to the user in a designated situation. The follow-up action may include, for example, a follow-up utterance. According to certain embodiments, the capsule DB 230 may include a layout registry that stores layout information that is information output through the user terminal 450. According to certain embodiments, the capsule DB 230 may include a vocabulary registry that stores vocabulary information included in capsule information. According to certain embodiments, the capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating the vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In certain embodiments, the capsule DB 230 may be implemented in the user terminal 450 as well.

The execution engine 240 may calculate a result using the generated plan. The end user interface 250 may transmit the calculated result to the user terminal 450. Accordingly, the user terminal 450 may receive the result and provide the received result to the user. The management platform 260 may manage information used by the intelligent server 200. The big data platform 270 may collect data of the user. The analytic platform 280 may manage a quality of service (QoS) of the intelligent server 200. For example, the analytic platform 280 may manage the components and processing rate (or efficiency) of the intelligent server 200. The back end storage 290 may include a multilingual parallel corpus used to provide an output in a language different from that of the voice input received from the user terminal 450 in the cross-language module 228. The multilingual parallel corpus may be generated using the developer tool 295.

The service server 300 may provide a designated service (e.g., food order or hotel reservation) to the user terminal 450. According to certain embodiments, the service server 300 may be a server operated by a third party. The service server 300 may provide information to be used for generating a plan corresponding to the received voice input to the intelligent server 200. The provided information may be stored in the capsule DB 230. In addition, the service server 300 may provide result information according to the plan to the intelligent server 200.

In the integrated intelligence system 10 described above, the user terminal 450 may provide various intelligent services to the user in response to a user input. The user input may include, for example, an input through a physical button, a touch input, or a voice input.

In certain embodiments, the user terminal 450 may provide a speech recognition service through an intelligent app (or a speech recognition app) stored therein. In this case, for example, the user terminal 450 may recognize a user utterance or a voice input received through the microphone, and provide a service corresponding to the recognized voice input to the user.

In certain embodiments, the user terminal 450 may perform a designated action alone or together with the intelligent server and/or a service server, based on the received voice input. For example, the user terminal 450 may execute an app corresponding to the received voice input and perform a designated action through the executed app.

In certain embodiments, when the user terminal 450 provides a service together with the intelligent server 200 and/or the service server, the user terminal 450 may detect a user utterance using the microphone 480 and generate a signal (or voice data) corresponding to the detected user utterance. The user terminal 450 may transmit the speech data to the intelligent server 200 using the communication interface 430.

The intelligent server 200 may generate, as a response to the voice input received from the user terminal 450, a plan for performing a task corresponding to the voice input or a result of performing an action according to the plan. The plan may include, for example, a plurality of actions for performing a task corresponding to a voice input of a user, and a plurality of concepts related to the plurality of actions. The concepts may define parameters input to the execution of the plurality of actions or result values output by the execution of the plurality of actions. The plan may include connection information between the plurality of actions and the plurality of concepts.

The user terminal 450 may receive the response using the communication interface 430. The user terminal 450 may output a speech signal generated in the user terminal 450 to the outside using the speaker 470, or output an image generated in the user terminal 450 to the outside using the display 460.

Figure 3:
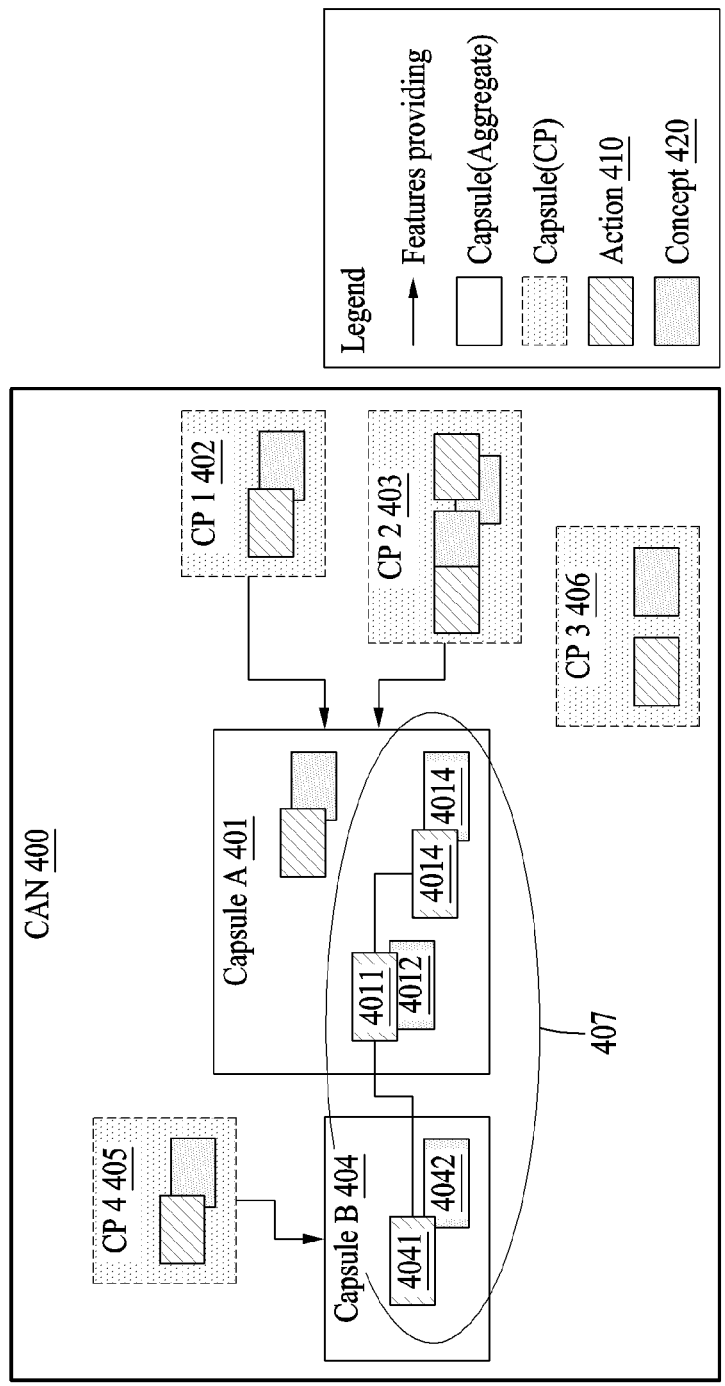
FIG. 3 illustrates a form in which relationship information between concepts and actions is stored in a database, according to embodiments of this disclosure.

FIG. 3 illustrates a form in which relationship information between concepts and actions is stored in a database according to various embodiments of this disclosure.

A capsule DB (e.g., the capsule DB 230) of the intelligent server 200 may store capsules in the form of a concept action network (CAN). The capsule DB may store an action for processing a task corresponding to a voice input of a user and a parameter necessary for the action in the form of a CAN.

The capsule DB may store a plurality of capsules (a capsule A 401 and a capsule B 404) respectively corresponding to a plurality of domains (e.g., applications). According to certain embodiments, one capsule (e.g., the capsule A 401) may correspond to one domain (e.g., a location (geo) or an application). Further, the one capsule may correspond to at least one service provider (e.g., CP 1 402 or CP 2 403) for performing a function for a domain related to the capsule. According to certain embodiments, one capsule may include at least one action 410 for performing a designated function and at least one concept 420.

The natural language platform 220 may generate a plan for performing a task corresponding to the received voice input using the capsules stored in the capsule DB. For example, the planner module 225 of the natural language platform 220 may generate the plan using the capsules stored in the capsule DB. For example, a plan 407 may be generated using actions 4011 and 4013 and concepts 4012 and 4014 of the capsule A 410 and an action 4041 and a concept 4042 of the capsule B 404.

Figure 4:
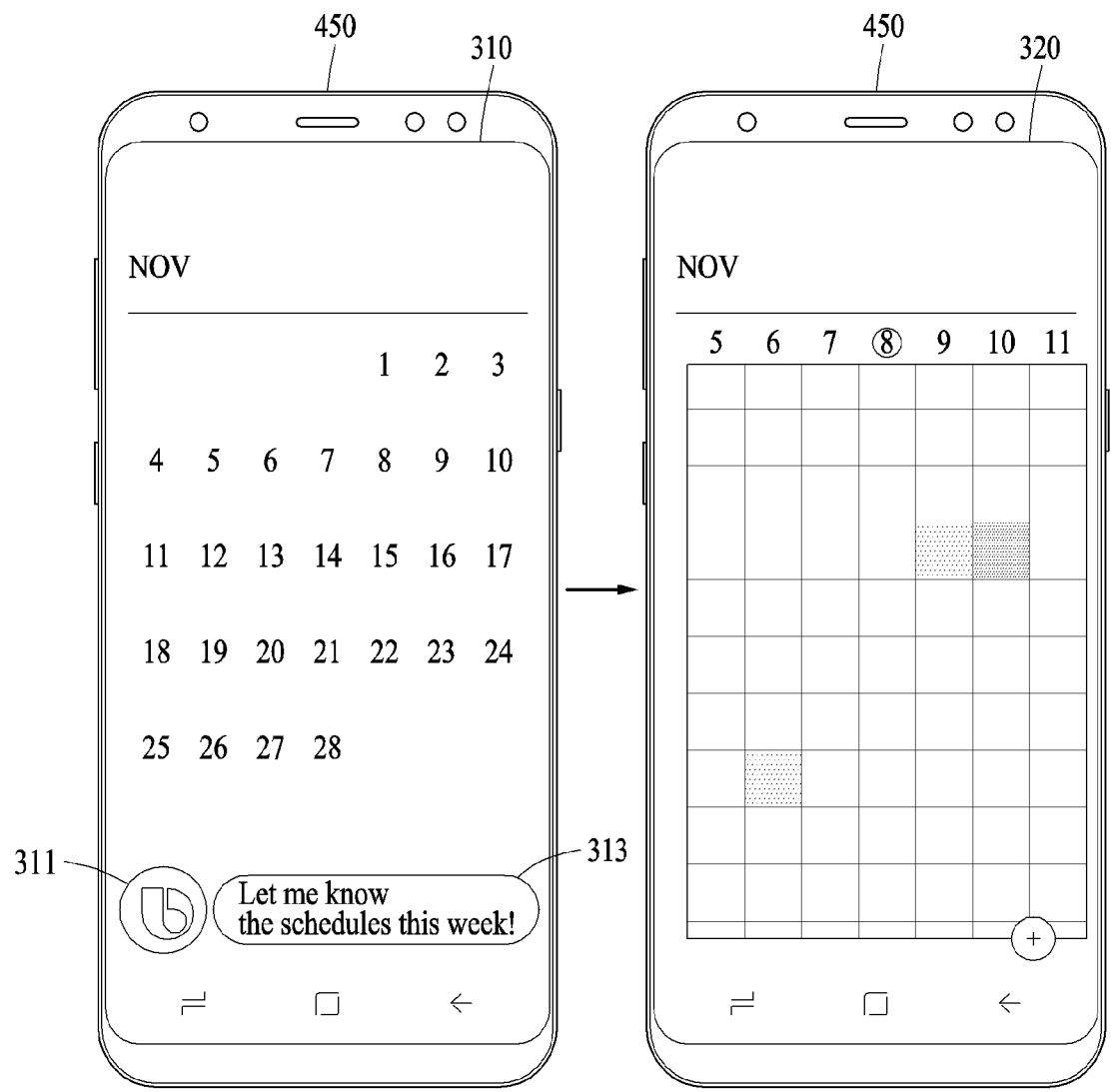
FIG. 4 illustrates a user terminal displaying a screen for processing a received voice input through an intelligent app according to embodiments of this disclosure.

FIG. 4 illustrates a screen of a user terminal processing a received voice input through an intelligent app according to various embodiments of this disclosure.

The user terminal 450 may execute an intelligent app to process a user input through the intelligent server 200.

According to certain embodiments, on a screen 310, when a designated voice input (e.g., Wake up!) is recognized or an input through a hardware key (e.g., a dedicated hardware key) is received, the user terminal 450 may execute an intelligent app for processing the voice input. The user terminal 450 may execute the intelligent app, for example, in a state in which a scheduling app is executed. According to certain embodiments, the user terminal 450 may display an object (e.g., an icon) 311 corresponding to the intelligent app on the display 460. According to certain embodiments, the user terminal 450 may receive a voice input by a user utterance. For example, the user terminal 450 may receive a voice input of "Let me know the schedules this week!". According to certain embodiments, the user terminal 450 may display a user interface (UI) 313 (e.g., an input window) of the intelligent app in which text data of the received voice input is entered on the display.

According to certain embodiments, on a screen 320, the user terminal 450 may display a result corresponding to the received voice input on the display. For example, the user terminal 450 may receive a plan corresponding to the received user input, and display "the schedules this week" on the display according to the plan.

Figure 5:
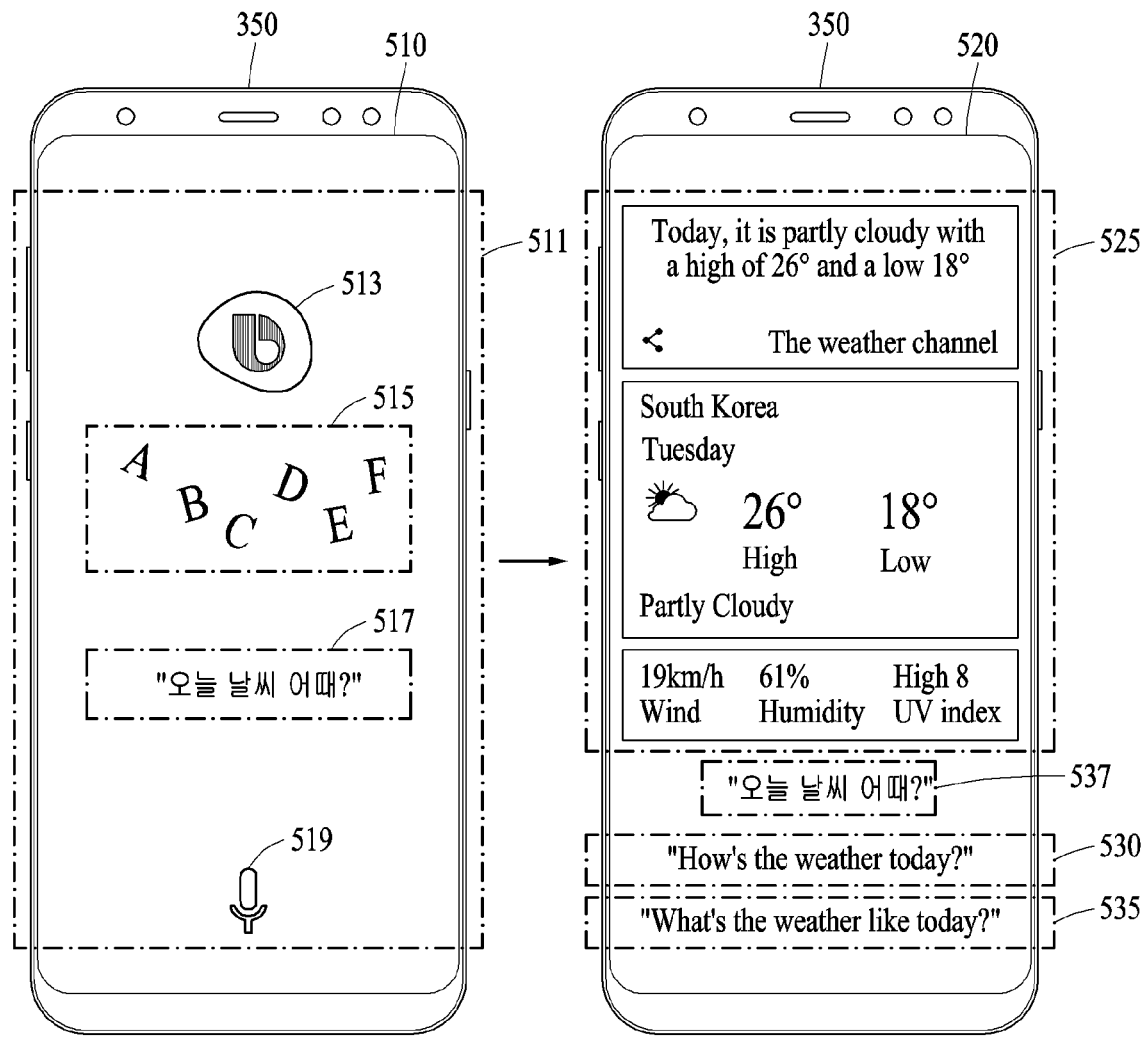
FIG. 5 illustrates a user terminal receiving a voice input and displaying a response to the voice input on a screen in a language different from the language of the voice input, according to embodiments of this disclosure.

FIG. 5 illustrates a user terminal receiving a voice input and displaying a response to the voice input on a screen in a language different from the language of the voice input, according to embodiments of this disclosure.

Referring to FIG. 5, a screen 510 of a user terminal 350 (e.g., the user terminal 450) receiving an utterance of a user in an input language and a screen 520 of the user terminal 350 displaying a response to the user utterance in an output language different from the input language are illustrated.

A voice command processing apparatus (not shown) (e.g., the integrated intelligence system 10) according to certain embodiments may output a response to a received user utterance in an output language different from an input language of the user utterance. The voice command processing apparatus may output the utterance in the output language, corresponding to the user utterance, along with the user utterance. The user may check the utterance in the output language corresponding to the user utterance in the input language and use the utterance in the output language for a subsequent voice command, thereby using a voice command service in a language other than the native language without trials and errors. The user may learn a foreign language expression by checking the utterance in the output language corresponding to the user utterance in the input language.

In FIG. 5, the user terminal 350 may execute an intelligent app to process a user input through an intelligent server (not shown) (e.g., the intelligent server 200).

According to certain embodiments, on the screen 510, when a designated voice input (e.g., Wake up!) is recognized or an input through a hardware key (e.g., a dedicated hardware key) is received, the user terminal 350 may execute an intelligent app for processing the voice input.

According to certain embodiments, the user terminal 350 may display a UI 511 of the intelligent app on the display 460. The UI 511 of the intelligent app may include an object (e.g., icon) 513 for setting an output language, an object (e.g., alphabets) 515 corresponding to a set output language, a region 517 for displaying text data of a user utterance received in an input language, and an object 519 (e.g., a microphone icon) for selecting an input language. The user may touch the object 513 for setting an output language and set an output language to be used for a response to a user utterance. The output language may be initialized to a language used in a system of the user terminal 350 unless separately set. The user may select a plurality of languages as the output language. The user may check the output language set through the object 515. When the user selects a plurality of languages as the output language, one of the plurality of languages may be set as a representative output language. In certain embodiments, the user may touch the object 519 for selecting an input language and select a language to be used for a voice command.

According to certain embodiments, the user terminal 350 may receive a voice input by a user utterance. For example, the user terminal 350 may receive a user utterance of "오늘 날씨 어때? [How's the weather today?]". According to certain embodiments, the user terminal 350 may display text data of the received user utterance in the region 517 of the UI 511 of the intelligent app on the display.

According to certain embodiments, when the user terminal 350 receives the user utterance, the user utterance may be analyzed based on the input language, and an utterance intent of the user utterance may be determined. In one example embodiment, the received user utterance may be transmitted to the intelligent server (not shown), and the determination of the intent of the user utterance may be performed by an NLU module (not shown) of the intelligent server (not shown) (e.g., the NLU module 223).

In certain embodiments, based on whether the set input language and the set output language are different languages, whether to output a response to the voice command in a language different from the input language may be determined. In one example embodiment, the determination of whether to output a response to the voice command in a language different from the input language may be performed by a cross-language module 628 of the intelligent server (not shown) (e.g., the cross-language module 228).

The cross-language module 628 may determine a standard utterance in the input language corresponding to the utterance intent of the user based on the determined utterance intent. The cross-language module 628 may extract a standard utterance in the output language corresponding to the determined standard utterance in the input language when the input language and the output language are different. When a plurality of languages is selected as the output language, the cross-language module 628 may extract language-dependent standard utterances corresponding to the standard utterance in the input language, respectively for the plurality of languages.

The cross-language module 628 may request response information necessary for generating an output response in the output language based on the extracted standard utterance in the output language, and receive the requested response information. In certain embodiments, the intelligent server (not shown) may generate an output response in the output language based on the response information in the output language. When a plurality of languages is selected as the output language, the cross-language module 628 may request response information necessary for generating language-dependent output responses respectively for the plurality of languages based on the extracted language-dependent standard utterances, and receive the requested response information. In certain embodiments, the intelligent server (not shown) may generate language-dependent output responses based on the received response information. The structure and operation of the cross-language module 628 will be described in detail below with reference to FIG. 6.

According to certain embodiments, on the screen 520, the user terminal 350 may receive an output response 525 (e.g., weather information response in English expressions to a Korean user utterance requesting weather information) in the output language, generated by the intelligent server (not shown), and display (or output) the output response 525 on the display 460. The user terminal 350 may output the output response as a speech (e.g., audio or written). When a plurality of languages is selected as the output language, the user terminal 350 may receive language-dependent output responses generated by the intelligent server (not shown) and display the language-dependent output responses on the display 460. The user terminal 350 may sequentially display the language-dependent output responses on the display 460. When the user sets a representative output language, the user terminal 350 may receive the language-dependent output responses generated by the intelligent server (not shown) and display an output response in the representative output language, of the language-dependent output responses, on the display 460.

In certain embodiments, the user terminal 350 may receive a standard utterance 530 in the output language along with the response in the output language and display the standard utterance 530 in the output language on the display 460. The user terminal 350 may further display an additional standard utterance 535 in the output language, similar to the standard utterance 530 in the output language. When a plurality of languages is selected as the output language, the user terminal 350 may receive language-dependent standard utterances corresponding to the standard utterance in the input language, and display the language-dependent standard utterances on the display 460. The user terminal 350 may display text data of the received user utterance in the region 537 of the screen 520.

When the input language and the output language are the same, the cross-language module 628 may request response information necessary for generating an output response in the input language based on the standard utterance in the input language, and receive the requested response information. The intelligent server (not shown) may generate an output response in the input language based on the received response information. When the input language and the output language are the same, the user terminal 350 may receive the output response in the input language, generated by the intelligent server (not shown), and display (or output) the output response in the input language on the display 460.

In certain embodiments, the standard utterance in the input language and the standard utterance in the output language may be retrieved from a multilingual parallel corpus. The multilingual parallel corpus stored in a back end storage (not shown) (e.g., the back end storage 290) may be generated using a developer tool (not shown) (e.g., the developer tool 295) according to certain embodiments. The multilingual parallel corpus will be described in detail below with reference to FIGS. 7 and 8.

An apparatus for processing voice commands (e.g., the voice command processing apparatus of FIG. 5 or the integrated intelligence system 10) according to certain embodiments may include a memory configured to store computer-executable instructions, and a processor configured to execute the computer-executable instructions, wherein the instructions may include receiving an utterance of a user in an input language set by the user, determining an utterance intent of the utterance by analyzing the utterance with the input language, determining a standard utterance in the input language corresponding to the utterance of the user based on the determined utterance intent, determining whether the input language and an output language are different languages, extracting a standard utterance in the output language corresponding to the determined standard utterance in the input language when the input language and the output language are different, generating an output response in the output language based on the extracted standard utterance in the output language, and outputting the output response.

The outputting of the output response may include outputting the standard utterance in the output language along with the output response.

The generating of the output response may include requesting response information necessary for generating the output response from a content provider corresponding to the standard utterance in the output language, receiving the requested response information, and generating the output response based on the received response information.

The requesting of the response information may include extracting a parameter corresponding to the standard utterance in the output language, writing a query to request the response information based on the parameter, and transmitting the query to the content provider.

The standard utterance in the input language and the standard utterance in the output language may be mapped by a unique ID.

The instructions may further include setting a plurality of languages as the output language, wherein the extracting may include extracting language-dependent standard utterances corresponding to the standard utterance in the input language, respectively for the plurality of languages, and the generating of the output response in the output language may include generating language-dependent output responses respectively for the plurality of languages, and the outputting of the output response may include outputting the language-dependent output responses.

The generating of the output response may further include outputting at least one of the language-dependent standard utterances.

The generating of the language-dependent output responses may include determining whether content providers corresponding to the respective language-dependent standard utterances are the same.

The generating of the language-dependent output responses may include requesting response information necessary for generating the language-dependent output responses from the content provider, when the content providers corresponding to the respective language-dependent standard utterances are the same, receiving the requested response information, and generating the language-dependent output responses based on the received response information.

The requesting of the response information necessary for generating the language-dependent output responses may include writing language-dependent queries to request the response information respectively for the plurality of languages based on parameters corresponding to the respective language-dependent standard utterances, and transmitting the language-dependent queries to the content provider.

The generating of the language-dependent output responses may include requesting response information necessary for generating the language-dependent output responses from the respective content providers corresponding to the language-dependent standard utterances, when the content providers corresponding to the respective language-dependent standard utterances are different, receiving the requested response information, and generating the language-dependent output responses based on the received response information.

The requesting of the response information necessary for generating the language-dependent output responses may include writing content provider-dependent queries to request the response information respectively from the content providers based on the parameters of the respective content providers, and transmitting the content provider-dependent queries to the respective content providers.

Figure 6:
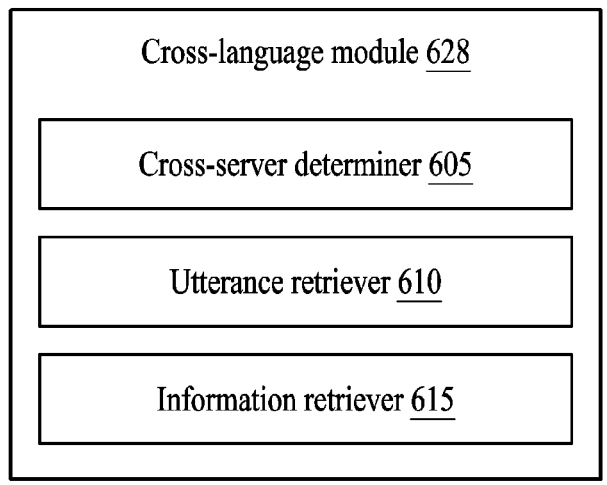
FIG. 6 illustrates a block diagram to describe a configuration of a cross-language module according to embodiments of this disclosure.

FIG. 6 is a block diagram to describe a configuration of the cross-language module 628 according to embodiments of this disclosure.

Referring to FIG. 6, the cross-language module 628 (e.g., the cross-language module 228) of a voice command processing apparatus (not shown) (e.g., the voice command processing apparatus (not shown) of FIG. 5 or the integrated intelligence system 10) may include a cross-service determiner 605, an utterance retriever 610, and an information retriever 615.

The cross-service determiner 605 may determine, based on whether input language and output language set by a user are different languages, whether to provide a response in a language different from the input language. In the user terminal 350, the input language and the output language may be initialized to be the same as a language used in the system of the user terminal 350. The input language and output language may be set by the user. A plurality of languages may be set as the output language. When the input language and the output language are set as different languages or when a plurality of languages is selected as the output language, the cross-service determiner 605 may determine to provide an output response in a language different from the input language. The cross-service determiner 605 may transmit the determination result to the utterance retriever 610.

The utterance retriever 610 may determine a standard utterance in the input language corresponding to the user utterance based on an utterance intent of the user utterance, determined by the NLU module 223 of FIG. 2. The standard utterance in the input language corresponding to the user utterance may be determined from a multilingual parallel corpus.

When the input language and the output language are different, the utterance retriever 610 may extract a standard utterance in the output language corresponding to the standard utterance in the input language to derive an output response in the output language. The standard utterance in the input language and the standard utterance in the output language may be mapped by a unique ID and included in the multilingual parallel corpus. The standard utterance in the output language may be extracted from the multilingual parallel corpus using the unique ID of the standard utterance in the input language.

When a plurality of languages is set as the output language, the utterance retriever 610 may extract language-dependent standard utterances corresponding to the standard utterance in the input language respectively for the plurality of languages, to derive output responses respectively for the plurality of languages. The standard utterance in the input language and the language-dependent standard utterances may be mapped by a unique ID and included in the multilingual parallel corpus. The language-dependent standard utterances may be extracted from the multilingual parallel corpus using the unique ID of the standard utterance in the input language.

In certain embodiments, the standard utterances may include parameters respectively corresponding to the standard utterances.

When the input language and the output language are the same, an intelligent server (not shown) may generate a response to the standard utterance in the input language without using the cross-language module 628.

In certain embodiments, when the input language is different from the output language, the information retriever 615 may request response information necessary for generating an output response in the output language based on the extracted standard utterance in the output language and receive the requested response information. The information retriever 615 may request the response information necessary for generating the output response in the output language from a content provider (e.g., the CP service A 301). The content provider may be predetermined for each standard utterance according to response information required for a standard utterance.

The information retriever 615 may write a query based on a parameter corresponding to the standard utterance in the output language to request the response information in the output language from the content provider. In certain embodiments, the information retriever 615 may receive the requested response information from the content provider. The intelligent server (not shown) may generate the output response in the output language based on the received response information.

In certain embodiments, the query may be written using the parameter corresponding to the standard utterance in the output language as a language-dependent parameter of the query based on an Application Programming Interface Uniform Resource Identifier (API URI) determined regardless of a language. The information retriever 615 may transmit the written query to the content provider.

In certain embodiments, when the standard utterance in the output language is a chitchat utterance (e.g., "뭐해? [What are you doing?]") that needs not separately request response information, the information retriever 615 may extract a response sentence corresponding to the standard utterance in the output language without requesting response information from the content provider. Chitchat refers to small talk without a specific purpose, and a chitchat utterance does not require any special information to respond to the utterance. For example, when the standard utterance in the output language is "뭐해? [What are you doing?]" which is a chitchat utterance, the information retriever 615 may extract a response sentence "밥 먹어요 [Having dinner]" corresponding to "뭐해? [What are you doing?]" without requesting response information from the content provider. The intelligent server (not shown) may generate an output response in the output language using the corresponding response sentence. Even when a plurality of languages is set as the output language, the information retriever 615 may operate for each of the plurality of languages in the same way as for the chitchat utterance.

In certain embodiments, when a plurality of languages is set as the output language, the information retriever 615 may request response information necessary for generating language-dependent output responses respectively for the plurality of languages from the content provider based on language-dependent standard utterances.

The content provider may be predetermined for each standard utterance according to response information required for a standard utterance. Content providers corresponding to the respective language-dependent standard utterances may be different. For example, when the Korean language and the English language are set as the output language, a content provider that provides response information for a Korean standard utterance corresponding to the standard utterance in the input language may be different from a content provider that provides response information for an English standard utterance corresponding to the standard utterance in the input language.

In certain embodiments, when a plurality of languages is set as output languages, the information retriever 615 may determine whether content providers predetermined for respective language-dependent standard utterances are the same.

When the content providers corresponding to the respective language-dependent standard utterances are the same, the information retriever 615 may write language-dependent queries to request response information necessary for generating language-dependent output responses.

In certain embodiments, a language-dependent query may be written for each language using a parameter corresponding to a language-dependent standard utterance as a language-dependent parameter of the query based on an API URI determined regardless of a language.

The information retriever 615 may transmit the written language-dependent queries to the content provider.

When the content providers corresponding to the respective language-dependent standard utterances are different, the information retriever 615 may write content provider-dependent queries for the respective content providers to request response information necessary for generating the language-dependent output responses. In certain embodiments, a content provider-dependent query may be written for each content provider using a parameter corresponding to a language-dependent standard utterance as a language-dependent parameter of the query based on an API URI determined regardless of a language. The information retriever 615 may transmit the written content provider-dependent queries respectively to the corresponding content providers.

In certain embodiments, the information retriever 615 may receive the requested response information from the content provider. The intelligent server (not shown) may generate language-dependent output responses based on the received response information.

Figure 7:
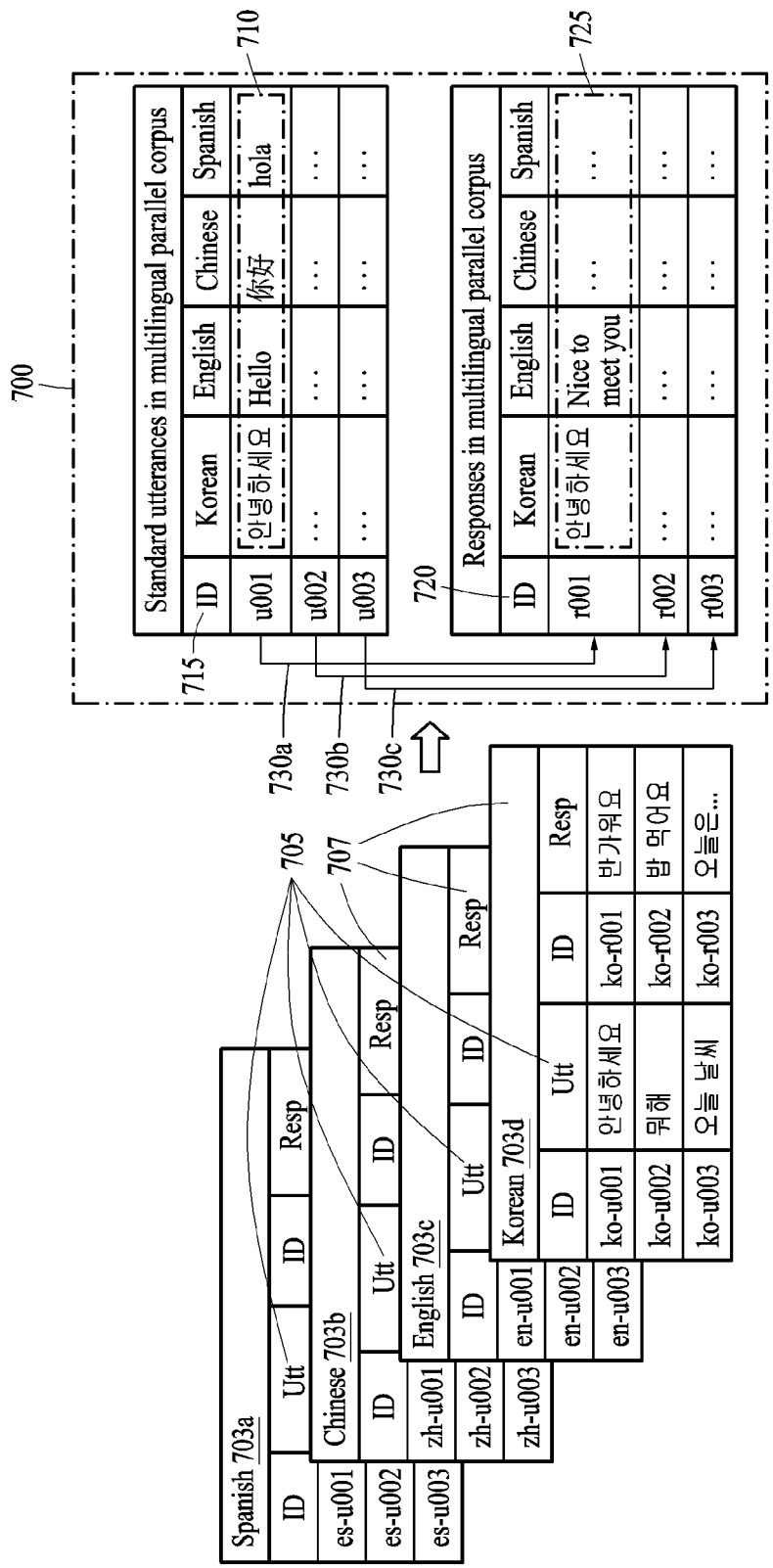
FIG. 7 illustrates a diagram to describe a process of generating a multilingual parallel corpus according to embodiments of this disclosure.

FIG. 7 is a diagram to describe a process of generating a multilingual parallel corpus according to embodiments of this disclosure.

Referring to FIG. 7, corpuses generated for respective languages and a multilingual parallel corpus generated by parallelizing the corpuses are shown.

For a voice command processing apparatus (not shown) (e.g., the voice command processing apparatus (not shown) of FIG. 5 or the integrated intelligence system 10) to recognize and process a voice command, a corpus including utterance intents of user utterances, standard utterances corresponding to the utterance intents and responses to the standard utterances may be needed. Here, the standard utterances may be utterances being criteria for user utterances variously expressed even for the same utterance intent. The corpuses 703a-703d generated for respective languages may be generated by separate generation tasks for respective languages, and standard utterances 705 are bound by a generic concept (e.g., weather, chitchat). Thus, it is not easy to find a direct connection among standard utterances 705 in different languages. When a response 707 to a user utterance is to be output in an output language different from an input language using the corpuses 703a-703d generated for respective languages, a voice command service may be provided by translating the user utterance into the output language. However, determining an intent by a translated utterance is unlikely to be successful.

A multilingual parallel corpus 700 according to certain embodiments may be generated by mapping corresponding standard utterances 710, of standard utterances in a plurality of languages, in parallel by a unique ID 715. The standard utterances and responses included in the multilingual parallel corpus 700 may include parameters (not shown) corresponding to the respective standard utterances and responses. The multilingual parallel corpus may include responses 725 that correspond to the standard utterances 710 mapped in parallel, as shown by arrows 730a-730c respectively linking each of the unique IDs 715 (e.g., u001, u002, u003) of the standard utterances 710 to each of the unique IDs 720 (e.g., r001, r002, r003) of the responses 725. In the multilingual parallel corpus 700, the responses 725, of the responses in the plurality of languages, are mapped in parallel by the unique ID 720.

By utilization of the multilingual parallel corpus 700, the integrated intelligence system 10 is able to provide a response in an output language different from an input language based on: an utterance succeeding in intent determination by retrieving a standard utterance in the input language corresponding to an utterance intent of a user utterance, and extracting a standard utterance in the output language, wherein the extracted standard utterance in the output language is mapped to the standard utterance in the input language by a unique ID. In certain embodiments, the unique ID may be an intent ID corresponding to the utterance intent.

The multilingual parallel corpus may be generated using a developer tool (not shown) (e.g., the developer tool 295). The developer tool (not shown) may serve to structure data in consideration of language extension when generating a multilingual parallel corpus. The developer tool (not shown) may classify standard utterances by unique ID based on a similarity between utterances and sentences that have the same meaning but are expressed differently. The developer tool (not shown) may suggest example sentences that can be written in different languages for each of the classified standard utterances. The developer tool (not shown) may align the example sentences written in different languages to correspond to each other. A translation model may be used for writing the example sentences by the developer tool (not shown), and a paraphrasing model may be used for classification according to sentence patterns or expressions for respective utterances.

Figure 8:
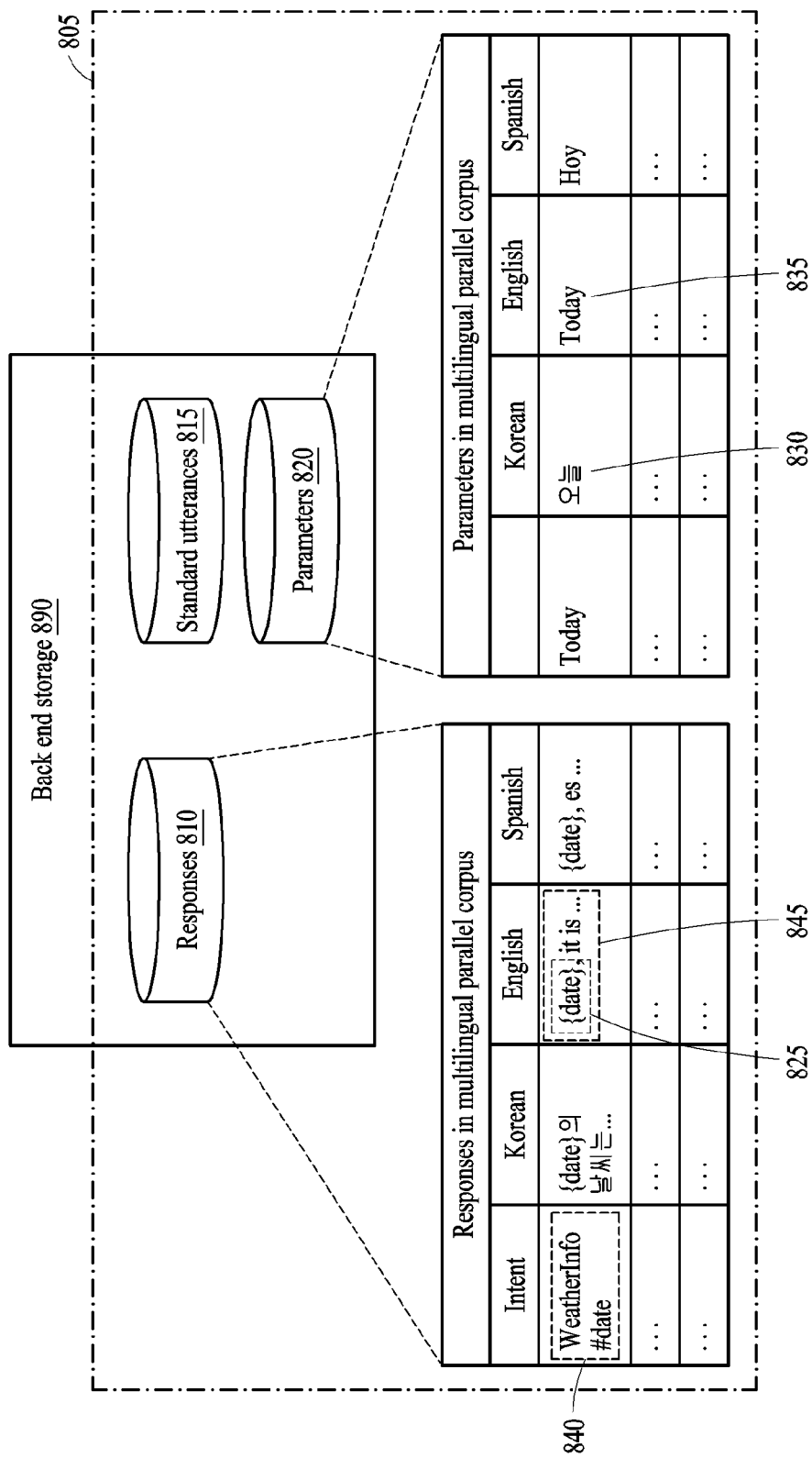
FIG. 8 illustrates a diagram to describe a structure of a multilingual parallel corpus according to embodiments of this disclosure.
Figure 9:
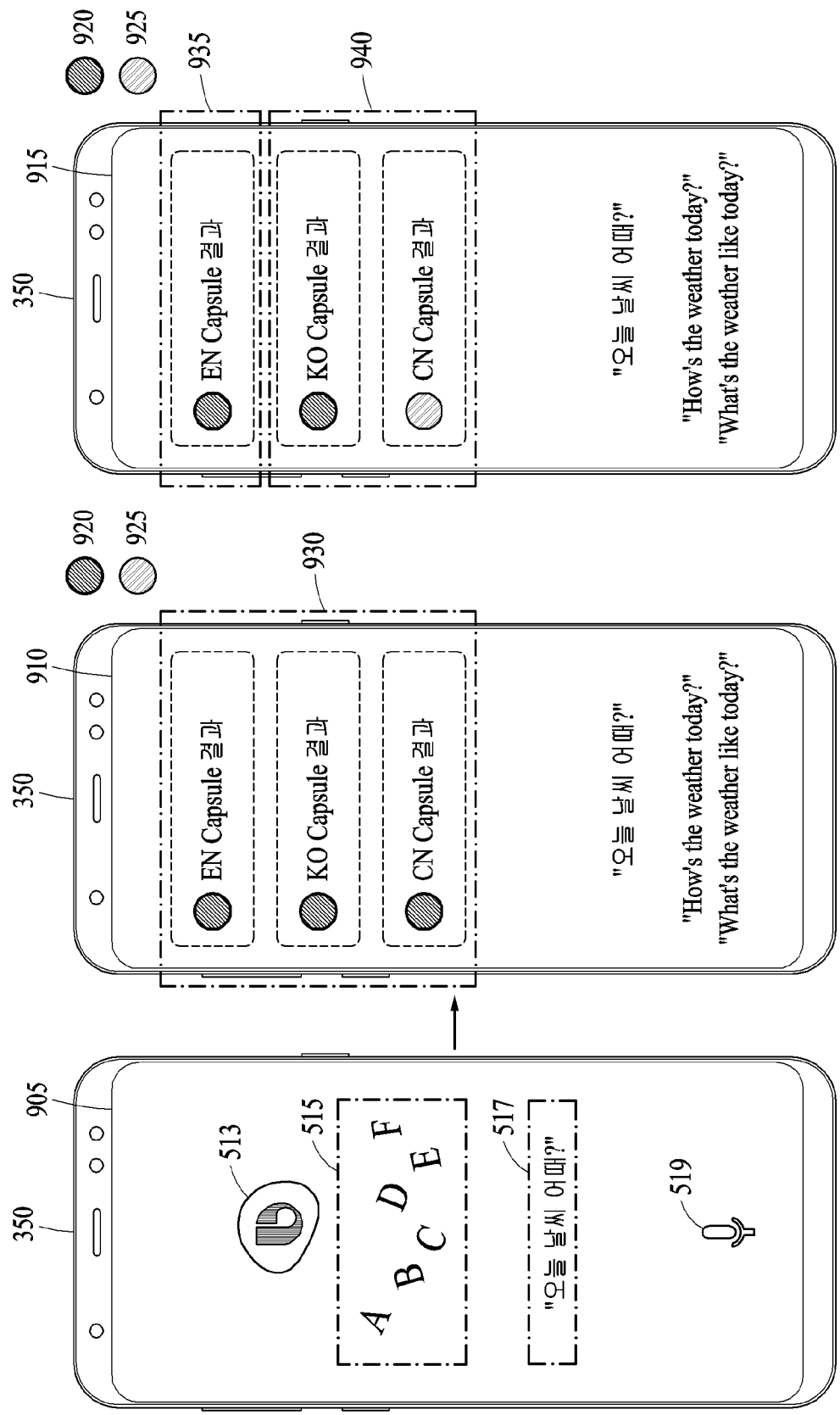
FIGS. 9A-9C illustrate a user terminal displaying language-dependent and content provider-dependent output responses on a screen according to another example embodiment.

FIG. 8 is a diagram to describe a structure of a multilingual parallel corpus according to embodiments of this disclosure.

Referring to FIG. 8, a multilingual parallel corpus 805 stored in a back end storage 890 (e.g., the back end storage 290) is illustrated. The multilingual parallel corpus 805 may include standard utterances 815 in a plurality of languages, which are corresponding standard utterances mapped in parallel according to an intent ID of an utterance intent, responses 810 corresponding to the standard utterances 815 and mapped in parallel according to the intent ID, and parameters 820 corresponding to the respective standard utterances 815 and responses 810.

According to certain embodiments, the utterance retriever 610 may determine, based on an utterance intent of a user utterance, a standard utterance in an input language corresponding to the utterance intent among the standard utterances 815 included in the multilingual parallel corpus 805. The utterance retriever 610 may extract a standard utterance in an output language mapped to the standard utterance in the input language from the multilingual parallel corpus 805 to derive an output response in the output language. When a plurality of languages is set as the output language, the utterance retriever 610 may extract language-dependent standard utterances mapped to the standard utterance in the input language from the multilingual parallel corpus 805 to derive output responses respectively for the plurality of languages.

The parameters 820 may be used when the information retriever 615 writes a query to be provided to a content provider to generate an output response. For example, when the standard utterance in the input language corresponding to the utterance intent of the user utterance is "오늘 날씨 어때? ? [How's the weather today?]", a value corresponding to " 오늘 [today]" may be included in the standard utterance as a parameter. When writing a query for requesting weather information of today in the Korean language, the information retriever 615 may request weather information of today by writing a query including " 오늘 [today]" 830 as a parameter. When weather information is to be checked in the English language, the information retriever 615 may write a query by changing the parameter of " 오늘 [today]" 830 of the query to the parameter of "today" 835.

The content provider may be predetermined for each standard utterance according to response information required for the standard utterance, and a parameter 820 used in a query to be transmitted to the content provider may be determined according to the content provider.

In certain embodiments, the intelligent server 200 may generate an output response using the responses 810, parameters 820 corresponding to the responses 810, and response information received by the information retriever 615. For example, when the standard utterance in the input language corresponding to the utterance intent of the user utterance is " 오늘 ? 날씨 어때? [How's the weather today?]" and weather information of today is to be output in the English language, the intelligent server 200 may generate an output response using an English response 845 mapped to the standard utterance in the input language by a unique ID 840 and using "today" 835 as a parameter 825 of the English response 845.

FIGS. 9A-9C illustrate a user terminal displaying language-dependent and content provider-dependent output responses on a screen according to another example embodiment.

Referring to FIGS. 9A-9C, a screen 905 (FIG. 9A) of the user terminal 350 receiving an utterance of a user in an input language, a screen 910 (FIG. 9B) of the user terminal 350 displaying language-dependent output responses in a plurality of languages as responses to the user utterance, and a screen 915 (FIG. 9C) of the user terminal 350 displaying output responses generated using response information received from different content providers 920 and 925 are illustrated. The screen 905 shown in FIG. 9A may be similar to the screen 510.

According to certain embodiments, when a plurality of languages is set as an output language, the information retriever 615 may request response information necessary for generating language-dependent output responses from content providers and receive the requested response information. The content providers providing response information necessary for generating the respective language-dependent output responses may be different for respective languages. The information retriever 615 may determine whether content providers providing information necessary for generating language-dependent output responses are different for respective languages.

When the content providers providing response information necessary for generating language-dependent output responses 930 are the same, the information retriever 615 may receive response information necessary for generating the language-dependent output responses 930 from the content provider. For example, when the English, Korean, and Chinese languages are set as the output language, the information retriever 615 may receive response information for generating output responses in the English, Korean, and Chinese languages. The intelligent server 200 may generate the language-dependent output responses 930 based on the received response information. The user terminal 350 may receive the language-dependent output responses 930 from the intelligent server 200 and display the language-dependent output responses 930 on the display 460. The user may check and compare the language-dependent output responses 930 through the screen 910 (FIG. 9B).

When content providers providing response information necessary for generating language-dependent output responses 935 and 940 are different, the information retriever 615 may receive the response information necessary for generating the language-dependent output responses 935 and 940 from the different content providers. For example, when the English, Korean, and Chinese languages are set as the output language, the information retriever 615 may receive response information necessary for generating English and Korean output responses from a first content provider 920 (e.g., the CP service A 301) and receive response information necessary for generating a Chinese output response from a second content provider 925 (e.g., the CP service B 302). The intelligent server 200 may generate the language-dependent output responses 935 and 940 based on the received response information. The user terminal 350 may receive the language-dependent output responses 935 and 940 from the intelligent server 200 and display the language-dependent output responses 935 and 940 on the display 460. The user may check and compare the language-dependent output responses and differences among content provider-dependent output responses through the screen 915.

Figure 10:
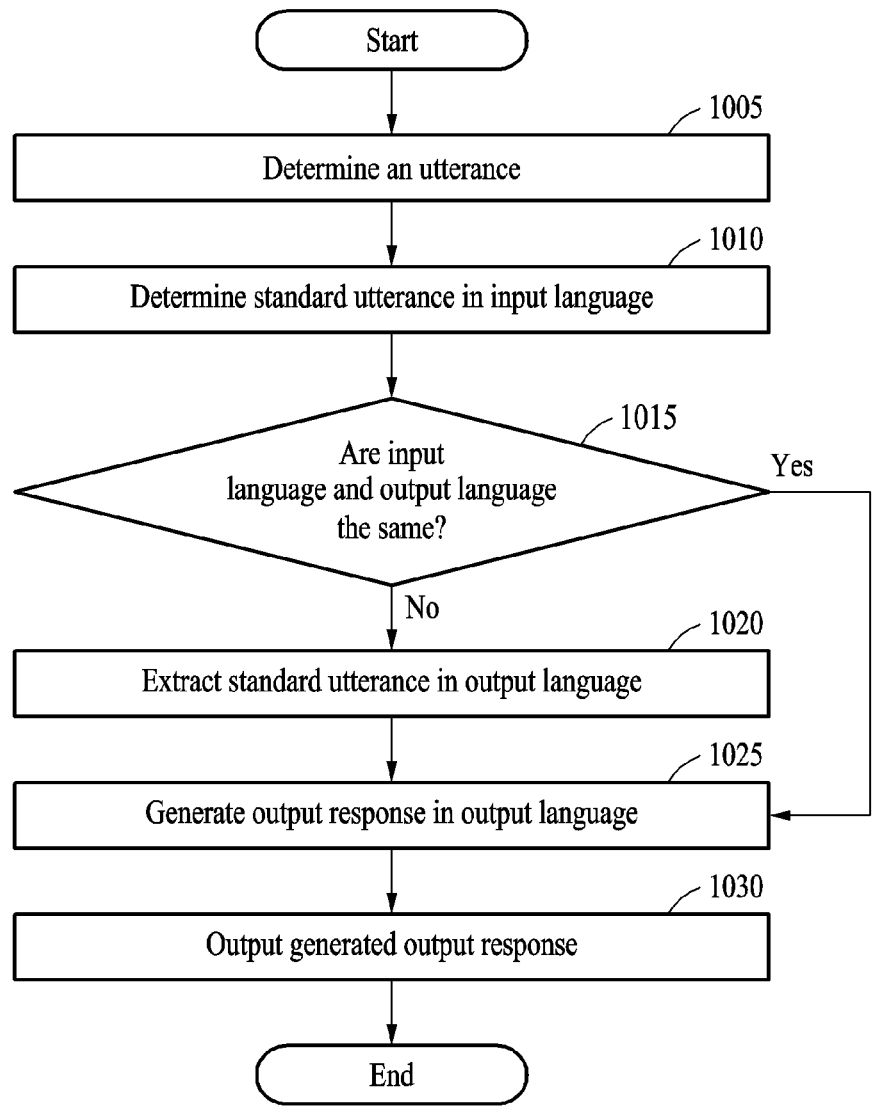
FIG. 10 illustrates an operation of a voice command processing apparatus according to embodiments of this disclosure.

FIG. 10 illustrates an operation of a voice command processing apparatus according to embodiments of this disclosure.

A voice command processing apparatus (not shown) (e.g., the voice command processing apparatus (not shown) of FIG. 5 or the integrated intelligence system 10) according to certain embodiments may output a response to a received user utterance in an output language different from an input language of the user utterance.

In operation 1005, the voice command processing apparatus may receive a user utterance in an input language set by a user and determine an utterance intent of the user utterance by analyzing the user utterance with the input language.

In operation 1010, the voice command processing apparatus may determine a standard utterance in the input language corresponding to the user utterance based on the determined utterance intent.

In operation 1015, the voice command processing apparatus may determine whether the input language and an output language are different languages. The output language may be set by the user. When the output language is not separately set by the user, the output language may be set to a language used in a system of the user terminal 350. A plurality of languages may be set as the output language. When a plurality of languages is set as the output language, the voice command processing apparatus may determine that the input language and the output language are different.

When the voice command processing apparatus determines the input language and the output language are different, the voice command processing apparatus may extract a standard utterance in the output language corresponding to the determined standard utterance in the input language, in operation 1020. The standard utterance in the input language and the standard utterance in the output language may be mapped by a unique ID and included in the multilingual parallel corpus. The standard utterance in the output language may be extracted from the multilingual parallel corpus using the unique ID of the standard utterance in the input language.

When a plurality of languages is set as the output language, the voice command processing apparatus may extract language-dependent standard utterances corresponding to the standard utterance in the input language, respectively for the plurality of languages.

In operation 1025, the voice command processing apparatus may generate an output response in the output language based on the extracted standard utterance in the output language. The voice command processing apparatus may request response information necessary for generating the output response in the output language from a content provider, receive the requested response information, and generate the output response in the output language from the received response information.

In operation 1025, when the input language and the output language are the same as a result of the determining in operation 1015, the voice command processing apparatus may generate an output response in the input language based on the standard utterance in the input language.

When a plurality of languages is set as the output language, the voice command processing apparatus may generate language-dependent output responses respectively for the plurality of languages based on the extracted language-dependent standard utterances. The voice command processing apparatus may request response information necessary for generating the language-dependent output responses from at least one content provider, receive the requested response information, and generate language-dependent output responses from the received response information.

In operation 1030, the voice command processing apparatus may output the generated output response. The voice command processing apparatus may further output a standard utterance in the output language. The voice command processing apparatus may further output another standard utterance in the output language similar to the standard utterance in the output language. When a plurality of languages is set as the output language, the voice command processing apparatus may output the generated language-dependent output responses. The voice command processing apparatus may further output standard utterances similar to the respective language-dependent standard utterances.

Operations 1005 to 1030 are not necessarily performed sequentially. The detailed operation of the voice command processing apparatus has been described in detail with reference to FIGS. 5 to 9, and thus, a duplicate description will be omitted.

Figure 11:
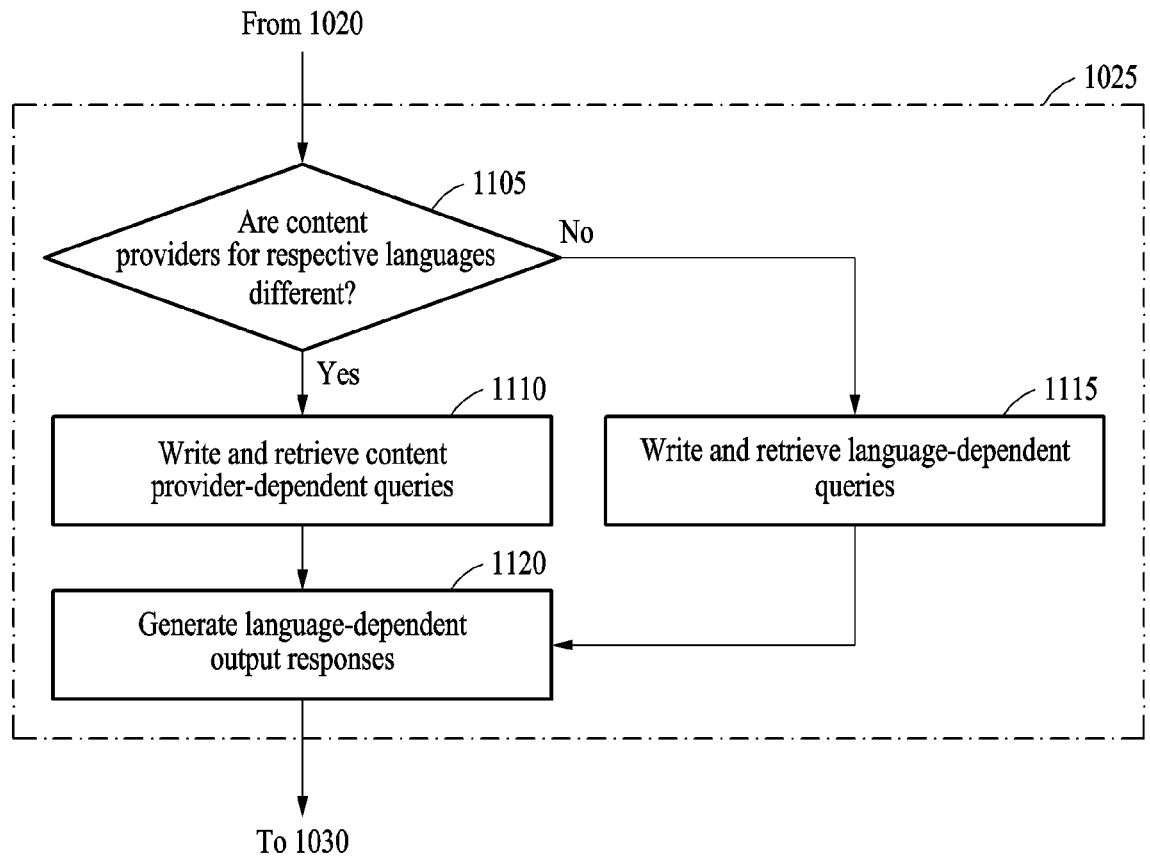
FIG. 11 illustrates an operation of generating an output response in an output language by a voice command processing apparatus according to embodiments of this disclosure.

FIG. 11 illustrates an operation of generating an output response in an output language by a voice command processing apparatus according to embodiments of this disclosure.

When a plurality of languages is set as an output language, a voice command processing apparatus (not shown) (e.g., the voice command processing apparatus (not shown) of FIG. 5 or the integrated intelligence system 10) according to certain embodiments may request response information necessary for generating language-dependent output responses respectively for the plurality of languages from at least one content provider, receive the requested response information, and generate language-dependent output responses from the received response information, in operation 1025.

In operation 1105, the voice command processing apparatus may determine whether content providers providing information necessary for generating language-dependent output responses are different for respective languages.

When content providers providing information necessary for generating language-dependent output responses are different for respective languages, the voice command processing apparatus may write content provider-dependent queries for the respective content providers to request response information necessary for generating the language-dependent output responses, in operation 1110. The voice command processing apparatus may transmit the written content provider-dependent queries respectively to the corresponding content providers. The voice command processing apparatus may receive response information from the content providers to which queries are transmitted.

When the content providers providing response information necessary for generating language-dependent output responses are the same, the voice command processing apparatus may write language-dependent queries to request response information necessary for generating the language-dependent output responses, in operation 1115. The voice command processing apparatus may transmit the written language-dependent queries to the content provider. The voice command processing apparatus may receive response information from the content providers to which queries are transmitted.

In operation 1120, the voice command processing apparatus may generate the language-dependent output responses based on the received response information. In operation 1030, the voice command processing apparatus may output the generated language-dependent output responses.

Operations 1105 to 1120 are not necessarily performed sequentially. The detailed operation of the voice command processing apparatus has been described in detail with reference to FIGS. 5 to 9, and thus, a duplicate description will be omitted.

A method of processing voice commands according to certain embodiments may include: receiving an utterance of a user in an input language set by the user, determining an utterance intent of the utterance by analyzing the utterance with the input language, determining a standard utterance in the input language corresponding to the utterance of the user based on the determined utterance intent, in a multilingual parallel corpus generated by mapping corresponding standard utterances in respective languages in parallel by a unique ID, determining whether the input language and an output language are different languages, extracting a standard utterance in the output language corresponding to the standard utterance in the input language from the multilingual parallel corpus based on a unique ID of the standard utterance in the determined input language, when the input language and the output language are different, generating an output response in the output language based on the extracted standard utterance in the output language, and outputting the output response.

The outputting of the output response may include outputting the standard utterance in the output language along with the output response.

The generating of the output response may include requesting response information necessary for generating the output response from a content provider corresponding to the standard utterance in the output language, receiving the requested response information, and generating the output response based on the received response information.

The requesting of the response information may include extracting a parameter corresponding to the standard utterance in the output language from the multilingual parallel corpus, writing a query to request the response information based on the parameter, and transmitting the query to the content provider.

The method may further include setting a plurality of languages as the output language, wherein the extracting may include extracting language-dependent standard utterances corresponding to the standard utterance in the input language from the multilingual parallel corpus based on a unique ID of the standard utterance in the input language, respectively for the plurality of languages, and the generating of the output response in the output language may include generating language-dependent output responses respectively for the plurality of languages, and the outputting of the output response may include outputting the language-dependent output responses.

The generating of the output response may further include outputting at least one of the language-dependent standard utterances.

The generating of the language-dependent output responses may include determining whether content providers corresponding to the respective language-dependent standard utterances are the same.

The generating of the language-dependent output responses may include requesting response information necessary for generating the language-dependent output responses from the content provider, when the content providers corresponding to the respective language-dependent standard utterances are the same, receiving the requested response information, and generating the language-dependent output responses based on the received response information.

The requesting of the response information necessary for generating the language-dependent output responses may include writing language-dependent queries to request the response information respectively for the plurality of languages based on parameters corresponding to the respective language-dependent standard utterances, and transmitting the language-dependent queries to the content provider.

The generating of the language-dependent output responses may include requesting response information necessary for generating the language-dependent output responses from the respective content providers corresponding to the language-dependent standard utterances, when the content providers corresponding to the respective language-dependent standard utterances are different, receiving the requested response information, and generating the language-dependent output responses based on the received response information.

The requesting of the response information necessary for generating the language-dependent output responses may include writing content provider-dependent queries to request the response information respectively from the content providers based on the parameters of the respective content providers, and transmitting the content provider-dependent queries to the respective content providers.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to certain embodiments of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to certain embodiments, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to certain embodiments, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An apparatus for processing voice commands, the apparatus comprising:
   a memory configured to store computer-executable instructions; and
   a processor coupled to the memory and configured to execute the computer-executable instructions,
   wherein the computer-executable instructions, when executed, cause the processor to perform a process of:
   receiving an utterance of a user in an input language set by the user;
   determining an utterance intent of the utterance by analyzing the utterance with the input language;
   determining a standard utterance in the input language corresponding to the utterance of the user based on the determined utterance intent;
   determining whether the input language and an output language are different languages;
   in response to determining the input language and the output language are different, extracting a standard utterance in the output language corresponding to the determined standard utterance in the input language;
   generating an output response in the output language based on the extracted standard utterance in the output language; and
   outputting the output response,
   wherein the generating of the output response in the output language comprises, when a plurality of languages are set as the output language, generating language-dependent output responses respectively for the plurality of languages, and
   wherein the generating of the language-dependent output responses comprises:
   requesting response information for generating the language-dependent output responses from a content provider, when content providers corresponding to respectively extracted language-dependent standard utterances are the same;
   receiving the requested response information; and
   generating the language-dependent output responses based on the received response information.

2. The apparatus of claim 1, wherein the outputting of the output response comprises outputting the standard utterance in the output language along with the output response.

3. The apparatus of claim 1, wherein the standard utterance in the input language and the standard utterance in the output language are mapped by a unique ID.

4. The apparatus of claim 1,
   wherein the extracting of the standard utterance in the output language comprises extracting the language-dependent standard utterances corresponding to the standard utterance in the input language, respectively for the plurality of languages;
   and
   wherein the outputting of the output response comprises outputting the language-dependent output responses.

5. The apparatus of claim 4, wherein the generating of the output response further comprises outputting at least one of the language-dependent standard utterances.

6. The apparatus of claim 4, wherein the generating of the language-dependent output responses comprises determining whether content providers corresponding to the respectively extracted language-dependent standard utterances are the same.

7. The apparatus of claim 1, wherein the requesting of the response information for generating the language-dependent output responses comprises:
  writing language-dependent queries to request the response information respectively for the plurality of languages based on parameters corresponding to the respectively extracted language-dependent standard utterances; and
  transmitting the language-dependent queries to the content provider.

8. An apparatus for processing voice commands, the apparatus comprising:
  a memory configured to store computer-executable instructions; and
  a processor coupled to the memory and configured to execute the computer-executable instructions,
  wherein the computer-executable instructions, when executed, cause the processor to perform a process of:
  receiving an utterance of a user in an input language set by the user;
  determining an utterance intent of the utterance by analyzing the utterance with the input language;
  determining a standard utterance in the input language corresponding to the utterance of the user based on the determined utterance intent;
  determining whether the input language and an output language are different languages;
  in response to determining the input language and the output language are different, extracting a standard utterance in the output language corresponding to the determined standard utterance in the input language;
  generating an output response in the output language based on the extracted standard utterance in the output language; and
  outputting the output response,
  wherein the generating of the output response in the output language comprises, when a plurality of languages are set as the output language, generating language-dependent output responses respectively for the plurality of languages, and
  wherein the generating of the language-dependent output responses comprises:
    requesting response information for generating the language-dependent output responses from respective content providers corresponding to language-dependent standard utterances, when the content providers corresponding to respectively extracted language-dependent standard utterances are different;
    receiving the requested response information; and
    generating the language-dependent output responses based on the received response information.

9. The apparatus of claim 8, wherein the requesting of the response information for generating the language-dependent output responses comprises:
  writing content provider-dependent queries to request the response information respectively from the content providers based on parameters of the respective content providers; and
  transmitting the content provider-dependent queries to the respective content providers.

10. A method of processing voice commands, the method comprising:
  receiving, by an electronic device, an utterance of a user in an input language set by the user;
  determining, by a processor of the electronic device, an utterance intent of the utterance by analyzing the utterance with the input language;
  determining, by the processor, a standard utterance in the input language corresponding to the utterance of the user based on the determined utterance intent, in a multilingual parallel corpus generated by mapping corresponding standard utterances in respective languages in parallel by a unique ID;
  determining, by the processor, whether the input language and an output language are different languages;
  extracting, by the processor, a standard utterance in the output language corresponding to the standard utterance in the input language from the multilingual parallel corpus based on a unique ID of the standard utterance in the determined input language, when the input language and the output language are different;
  generating, by the processor, an output response in the output language based on the extracted standard utterance in the output language; and
  outputting the output response,
  wherein the generating of the output response in the output language comprises, when a plurality of languages are set as the output language, generating language-dependent output responses respectively for the plurality of languages, and
  wherein the generating of the language-dependent output responses comprises:
    requesting response information for generating the language-dependent output responses from a content provider, when content providers corresponding to respectively extracted language-dependent standard utterances are the same;
    receiving the requested response information; and
    generating the language-dependent output responses based on the received response information.

11. The method of claim 10, wherein the outputting of the output response comprises outputting the standard utterance in the output language along with the output response.

12. The method of claim 10, wherein the requesting of the response information comprises:
  extracting a parameter corresponding to the standard utterance in the output language from the multilingual parallel corpus;
  writing a query to request the response information based on the parameter; and
  transmitting the query to the content provider.

13. The method of claim 10,
  wherein the extracting comprises extracting language-dependent standard utterances corresponding to the standard utterance in the input language from the multilingual parallel corpus based on a unique ID of the standard utterance in the input language, respectively for the plurality of languages, and
  wherein the outputting of the output response comprises outputting the language-dependent output responses.

14. The method of claim 13, wherein the generating of the output response further comprises outputting at least one of the language-dependent standard utterances.

15. The method of claim 13, wherein the generating of the language-dependent output responses comprises determining whether content providers corresponding to the respectively extracted language-dependent standard utterances are the same.

16. A non-transitory computer-readable storage medium storing instructions that, when executed by a processor, cause the processor to perform the method of claim 10.

\* \* \* \* \*